Nov. 7, 1950 L. A. WILLIAMS 2,528,568
EXPANSIBLE BASKET WEAVE CHAIN
Filed Aug. 18, 1947 3 Sheets-Sheet 1
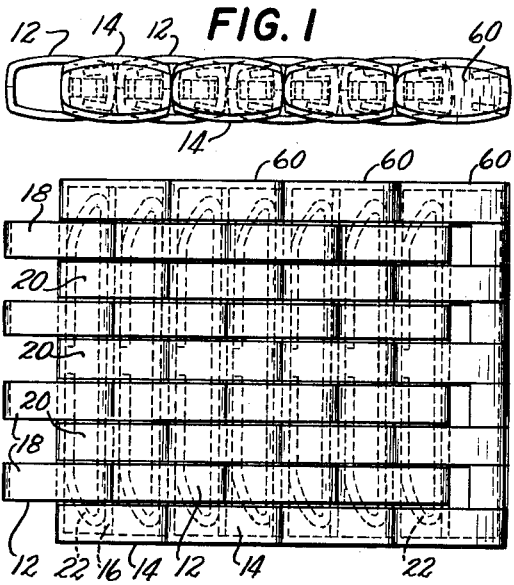
FIG. 1
FIG. 2
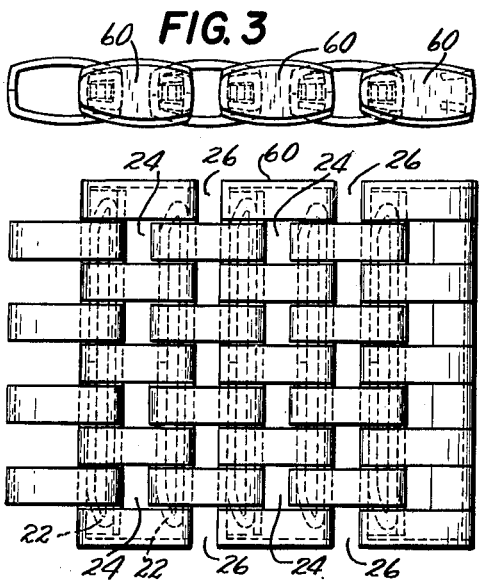
FIG. 3
FIG. 4
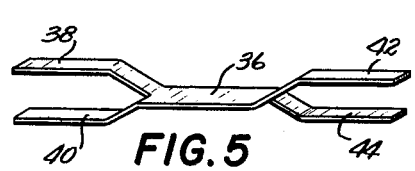
FIG. 5
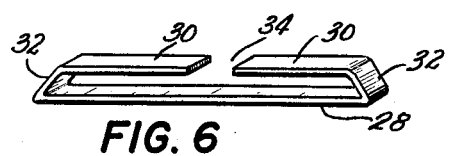
FIG. 6
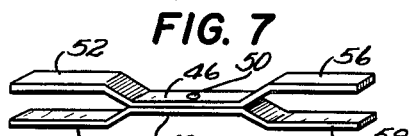
FIG. 7
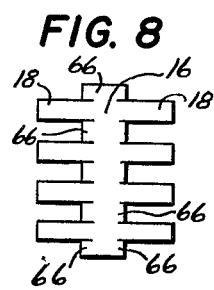
FIG. 8
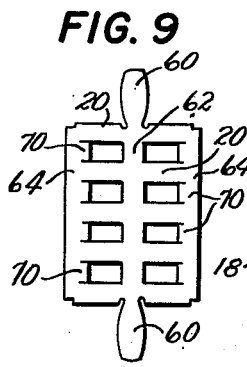
FIG. 9
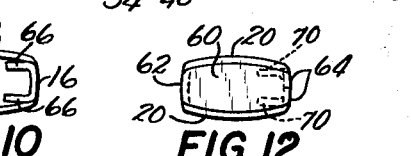
FIG. 10 FIG. 12
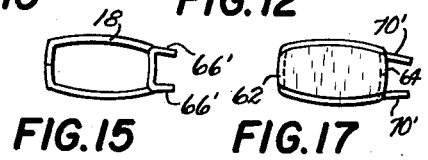
FIG. 15 FIG. 17
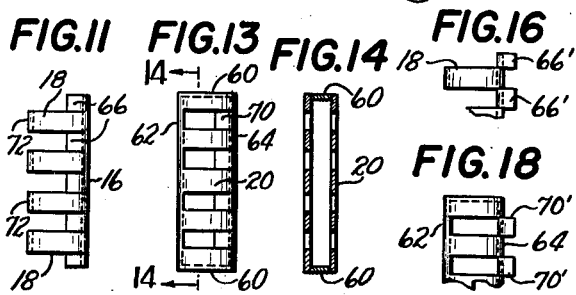
FIG. 11 FIG. 13 FIG. 14 FIG. 16
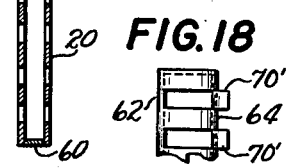
FIG. 18
INVENTOR.
LEON A. WILLIAMS
BY James and Franklin
ATTORNEYS.

Nov. 7, 1950 — L. A. WILLIAMS — 2,528,568
EXPANSIBLE BASKET WEAVE CHAIN
Filed Aug. 18, 1947 — 3 Sheets-Sheet 2

INVENTOR.
LEON A. WILLIAMS
BY James and Franklin
ATTORNEYS.

Nov. 7, 1950           L. A. WILLIAMS           2,528,568
EXPANSIBLE BASKET WEAVE CHAIN
Filed Aug. 18, 1947           3 Sheets-Sheet 3
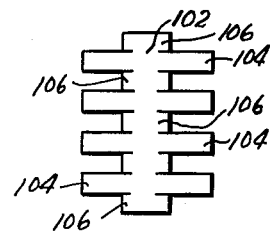
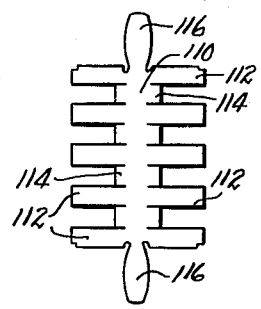
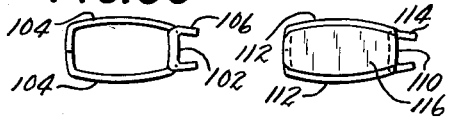
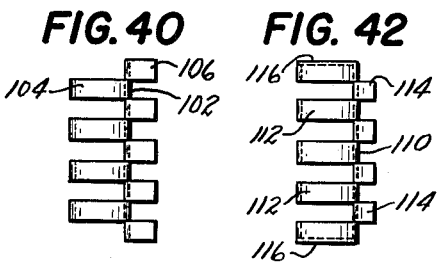
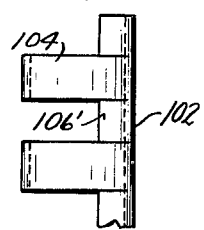
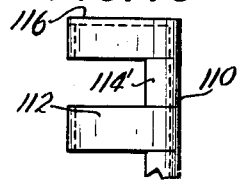
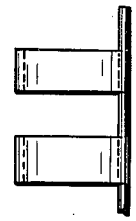
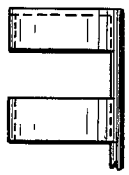
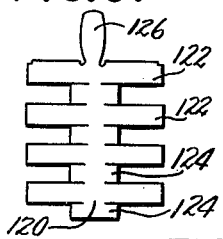
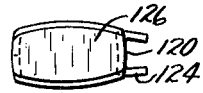
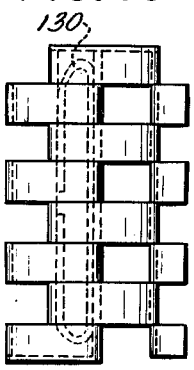
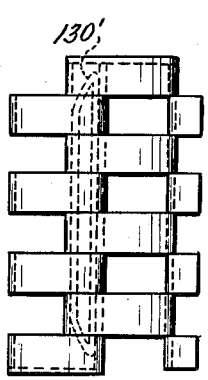
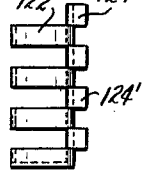
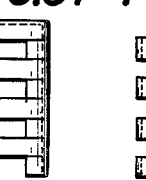
INVENTOR
LEON A. WILLIAMS
BY
*James and Franklin*
ATTORNEYS Patented Nov. 7, 1950

2,528,568

UNITED STATES PATENT OFFICE 2,528,568

EXPANSIBLE BASKET-WEAVE CHAIN

Leon A. Williams, Waterbury, Conn., assignor to Benrus Watch Company, Inc., New York, N. Y., a corporation of New York Application August 18, 1947, Serial No. 769,289

14 Claims. (Cl. 59—79)

This invention relates to chain, especially jewelry chains of the basket-weave type, and more particularly to an expansible chain intended for use as a wrist-watch strap.

A true basket-weave chain is made up of a plurality of rows of small links, alternate rows having the links displaced relative to the intermediate rows so that the chain when viewed from above has a formation somewhat resembling a basket weave. Such chains have been revived in popularity in a simplified and less expensive form in which the links are made of sheet metal blanks which extend entirely across the width of the chain, said blanks including arms which simulate small links. Pivot pins extending across the chain are eliminated, and instead the arms of one blank are bent around the connecting cross-bar of an adjacent blank, thereby connecting and pivoting the links on one another.

The object of the present invention is to generally improve basket-weave chains. A more particular object is to devise a basket-weave chain which is expansible, that is, one which normally resiliently contracts in length, but may be readily expanded under tension.

In accordance with the current vogue, a close mesh or basket-weave is preferred, and the present invention provides the desired close mesh, the links overlapping fully when the chain is contracted, and the amount of overlap being reduced as the chain is expanded.

Still another object of the invention is to prevent the chain from being bent sharply at a single point between two links.

A further object is to provide spacers, if desired, to limit the expansion of the chain and thereby to protect the springs against excessive flattening.

In accordance with further features and objects of the invention, the links are provided with end tabs which close the ends of the links, thereby holding the springs in position and at the same time concealing the springs and giving the chain a richer and more solid and finished appearance.

A still further object of the invention is to apply the same to different kinds of basket-weave chains made up of differently shaped links or blanks, including those disclosed in my co-pending applications Serial Nos. 725,565 and 725,566, filed January 31, 1947.

To accomplish the foregoing general objects and other more specific objects which will hereinafter appear, my invention resides in the chain elements and their relation one to another, as are hereinafter more particularly described in the following specification. The specification is accompanied by drawings in which:

Fig. 1 is a side elevation of a piece of expansible basket-weave chain in contracted condition;

Fig. 2 is a plan view thereof;

Fig. 3 is a side elevation like Fig. 1, but showing the chain in expanded condition;

Fig. 4 is a plan view thereof;

Fig. 5 is a perspective view of one form of spring which may be used in my invention;

Figs. 6 and 7 are perspective views of modified springs;

Figs. 8 and 9 show blanks for male and female links respectively, for one form of chain;

Figs. 10 and 11 are end and plan views respectively of a male link formed from the blank of Fig. 8;

Figs. 12 and 13 are end and plan views respectively of a female link formed from the blank of Fig. 9;

Fig. 14 is a section taken approximately in the plane of the line 14—14 of Fig. 13;

Figs. 15 and 16 are end and fragmentary plan views respectively of a modified male link formed from the blank of Fig. 8;

Figs. 17 and 18 are end and fragmentary plan views respectively of a modified female link formed from the blank of Fig. 9;

Figs. 37 and 38 show blanks for alternate and intermediate links of a modified chain using only male links;

Figs. 39 and 40 are end and plan views respectively of a link made from the blank of Fig. 37;

Figs. 41 and 42 are end and plan views respectively of a link made from the blank of Fig. 38;

Figs. 43 and 44 are end and fragmentary plan views respectively of a modified link made from the blank of Fig. 37;

Figs. 45 and 46 are end and fragmentary plan views of a modified link made from the blank of Fig. 38;

Figs. 47 and 48 are fragmentary plan views of modified links devoid of guides or spacers;

Fig. 49 is a fragmentary plan view of a modified chain in contracted condition;

Fig. 50 is a similar view with the chain in expanded condition;

Fig. 51 shows a blank used for the links of the chain of Fig. 49;

Figs. 52 and 53 are end and plan views respectively of a link formed from the blank of Fig. 1;

Figs. 54 and 55 are end and plan views respectively of a similar link formed from the same blank, but reversed in position;

Figs. 56 and 57 are end and plan views respectively of a modified link made from the blank of Fig. 51; and Figs. 58 and 59 are end and plan views of the same link in reversed position.

Figure 19:
Figs. 19 and 20 are end and fragmentary plan views respectively of a modified male link.
Figure 21:
Figs. 21 and 22 are end and fragmentary plan views respectively of a modified female link.
Figure 20:
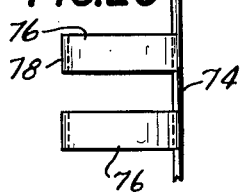
Figure 22:
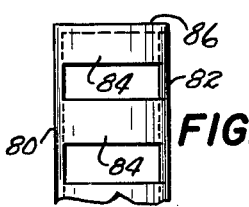

Referring to the drawings, and more particularly to Figs. 1 and 2, the expansible basket-weave chain is made up of links 12 and 14 connected in alternation, said links each being a folded sheet metal blank having a cross-bar 16 with arms 18 projecting transversely therefrom, said blanks being folded to form tubular-like links extending transversely of the chain, the arms 18 of alternate links being staggered relative to the arms 20 of the intermediate links, with the arms of one link bent around the cross-bar of the adjacent link. In this case the arms 20 are bent around the cross-bar 16. The arms 18 and 20 form rows of simulated links or sub-links which extend longitudinally of the chain in basket-weave formation. The chain further comprises springs 22 inserted between the cross-bar of each link and the ends of the arms of the next link bent around the cross-bar. The springs 22 serve normally to cause the links to have a closed-up or solid mesh appearance, as shown in Figs. 1 and 2. However, these springs afford expansion of the chain when placed under tension, as shown in Figs. 3 and 4. In the latter figures it will be noted that the springs 22 are flattened relative to their condition in Figs. 1 and 2, and that the mesh or weave of the chain has been opened up, thus providing spaces or openings 24 and 26 in the chain. The springs serve a dual function. The primary purpose is to make the chain yieldable or expansible. A secondary function is to give the chain a closed-up or solid mesh appearance, for even the expanded chain of Fig. 4 has considerable overlap of the links. As worn, the chain is usually contracted.

The springs are preferably leaf springs extending transversely of the chain and transversely of the arms, and parallel to the cross-bars. The spring 22 shown in Figs. 1 through 4 is drawn separately in Fig. 6, it comprising a back wall 28 and front walls 30 connected by end walls 32. A space 34 is left between the walls 30 so that the walls 30 can approach one another longitudinally as the spring is compressed laterally. This change can be seen by comparison of Figs. 2 and 4.

Another form of spring is shown in Fig. 5, this comprising a strip of spring metal 36 slit longitudinally at both ends, the end portions being oppositely displaced to form yieldably spaced arms 38, 40, 42 and 44.

Still another form of spring which may be used in the present invention is illustrated in Fig. 7. In this case, two spring strips 46 and 48 are secured together, as by means of riveting or spot-welding at 50, the end portions of the strip being oppositely displaced to provide yieldably spaced arms 52, 54, 56 and 58.

Reverting to Figs. 1 through 4, alternate link ends have tabs 60 bent transversely of the link to close the end of the link. When the chain is in the contracted position shown in Figs. 1 and 2, the side edges of the chain are closed, thus giving the same a relatively rich, solid and finished appearance. The end closures serve a most important function in holding the springs in position. They also conceal the springs, and this is true even when the chain is pulled to open-mesh condition, as shown in Figs. 3 and 4.

The particular chain shown in Figs. 1 through 4 is made up of male and female links used in alternation. A blank for the male link is shown in Fig. 8, and a blank for the female link is shown in Fig. 9. The male link comprises a center cross-bar 16 with arms 18 projecting transversely therefrom. The female link comprises a center cross-bar 62 and collateral edge bars 64, the arms 20 extending transversely and connecting the center and edge bars. The female link also has end tabs 60.

The male blanks are provided with guides 66, and the female blanks are provided with guides 70.

The male blank is folded to form a tubular-like link shown in Figs. 10 and 11. The arms 18 are bent sidewardly from the cross-bar 16, and the ends of the arms are bent inwardly, as shown at 72. The guides 66 are in effect projections slidably received between the arms of the next link, said guides functioning to prevent the chain from being bent too sharply at a single point between two adjacent links. More specifically, the guides are short arms disposed between the regular arms of the same link, and slidably received between the regular arms of the next link. In the present case the guides 66 are bent in the same direction as the regular arms 18, and thus function as spacers as well as guides, that is, they limit the maximum expansion of the chain and thus prevent excessive flattening of the springs.

The female blank shown in Fig. 9 is bent to shape as shown in Figs. 12, 13 and 14. For this purpose the arms 20 are bent away from the cross-bar 62, and the edge bars 64 are bent inwardly. The combined guides and spacers 70 are bent inwardly from the edge bars 64. The end tabs 60 are bent transversely of the cross-bar and are received between the endmost arms. In Figs. 9 and 12 it will be seen that the corners of the blank are cut away, thus forming recesses against which the ends of the tabs 60 may rest solidly.

The details of the blanks and links and the method of assembly of the same are described in greater detail in my co-pending application Serial No. 725,566, previously referred to. For the present it will suffice to point out that the arms 18 of the male blank are staggered relatively to the arms 20 of the female blank, so that the arms 18 are received between the arms 20. To assemble the chain, the links are only partially closed compared to Figs. 10 through 13. The arms 18 are then threaded through the openings of the female link and around the cross-bar 62. The female link is then closed to bring the edge bars 64 together. This provides pairs of links. The arms 18 of each pair are then closed around the edge bars 64 of the next pair. In this way the pairs of links are readily joined to build up the complete chain.

The springs may be inserted in either of two ways. One method is to leave the end tabs 60 of the female link open. After the chain is assembled the springs are slid into position endwise through the open ends of the links. The end tabs are then closed to hold the springs in position. Another and less convenient method is to place one spring within each female link. The arms of the male link are then threaded through the female link around the spring. The second spring is added and the female link is closed. When joining the pairs of links, the ends of the arms of the male link must be closed around the latter of the two springs, the other spring already being confined between the cross-bars of the male and female link of the pair of links.

Figs. 15 and 16 show a modfied method of folding the male blank to form the male link. In this case the short arms 66' are bent in opposite direction, that is, away from the regular arms 18. In this case the parts 66' act as guides but not as spacers. In other words, they function to prevent excessively sharp bending of the chain at one point, but they do not prevent maximum expansion of the chain against the springs.

Figs. 17 and 18 show the corresponding formation of the female link, the short arms 70' being bent outwardly instead of inwardly from the edge bars 64.

A modification which eliminates the short arms, is shown in Figs. 19 through 22 of the drawings. In this case the male link comprises a cross-bar 74 with arms 76 extending transversely therefrom, the ends of the arms being bent inwardly at 78. The female link comprises a cross-bar 80 and edge bars 82, with arms 84 extending transversely therebetween. End tabs 86 are bent around from the cross-bar 80, thereby closing the ends of the links. It will be understood that pairs of links are preliminarily assembled, as previously described, the male links being preliminarily threaded through the female links while both links are partially open, following which the female links are closed to bring the edge bars 82 together. The end tabs are preferably left partially or wholly open. The pairs of links are then assembled by closing the male arms around the edge bars of the next pair of links. Finally, the springs are inserted and the end tabs closed.

Figure 23:
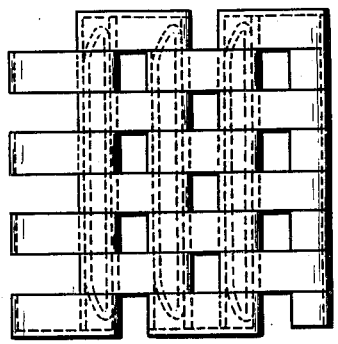
Fig. 23 is a plan view of a modified piece of chain in expanded condition.
Figure 24:
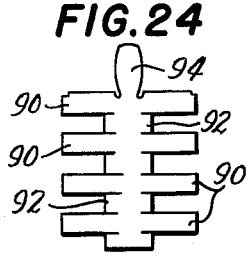
Figs. 24 and 25 show male and female blanks for the links of the chain shown in Fig. 23.
Figure 25:
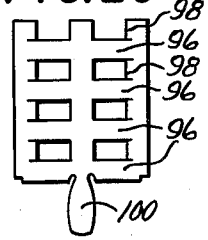

It is not essential that both end tabs be provided on the female link, and Figs. 23 through 25 illustrate a modification in which one end tab is provided on the male link and another on the female link. In this case there are an even number (eight) rather than an odd number of rows of sub-links in the chain. Specifically, the male blank has four arms 90 on each side and four guides 92 on each side. The end tab must always be located at a pair of arms, and in this case the end tab 94 is located at the end arms. The female blank has four pairs of arms 96 and four pairs of guides 98 at the edge bars. The end tab 100 is located at the end arms 96.

Figure 26:
Figs. 26 and 27 are end and plan views respectively of a male link formed from the blank of Fig. 24.
Figure 28:
Figs. 28 and 29 are end and plan views respectively of a female link formed from the blank of Fig. 25.
Figure 27:
Figure 29:

The male blank is folded as shown in Figs. 26 and 27, while the female blank is folded as shown in Figs. 28 and 29. The blanks are assembled as previously described, by interleaving the arms before the blanks are fully closed, thus forming pairs in each of which the female link may be fully closed. The pairs are then joined by closing the male link around the edge bars of the next pair of links. Finally, the springs are inserted and the end tabs closed. Reverting to Fig. 23, it will be seen that an important difference in the finished chain is that the closed ends are staggered on opposite sides of the chain.

Figure 30:
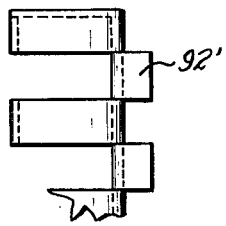
Fig. 30 is a fragmentary view similar to Fig. 27, but showing a modification formed from the blank of Fig. 24.
Figure 31:
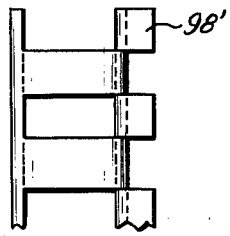
Fig. 31 is a fragmentary view similar to Fig. 29, but showing a modification formed from the blank of Fig. 25.

In this modification of the invention, the guides are used also as spacers, but it will be understood that they may be used solely as guides by simply bending the same in opposite direction, as shown at 92' and 98' in Figs. 30 and 31.

Figure 34:
Fig. 34 is an edge view of the chain in contracted condition.
Figure 35:
Fig. 35 is a similar view of the chain in partially expanded condition.
Figure 36:
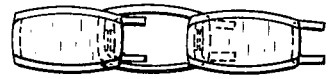
Fig. 36 is a similar view of the chain in fully expanded condition.

The manner in which the chain may be fully expanded when devoid of spacers, will be clear from study of Figs. 34, 35 and 36. In Fig. 34 there is no tension on the chain and the springs are fully expanded, thereby bringing the male links into edge to edge contact and the female links into edge to edge contact. In other words, the mesh is solid, or fully closed. In Fig. 35, some tension has been placed upon the chain, and it has been partially expanded. In Fig. 36 a greater tension has been placed on the chain and it has been fully expanded. The springs have been flattened to minimum thickness.

Reverting to Figs. 1 and 3, it will be seen that Fig. 34 is comparable to Fig. 1, the chain being fully contracted. Fig. 35 is comparable to Fig. 3, but in Fig. 3 the chain has been extended to the maximum expansion permitted by the spacers. The springs have not been completely flattened, and one advantage of the use of spacers is that the springs are protected. However, a disadvantage is that the chain is not as expansible. Fig. 36 shows the full expansion afforded when no spacers are used, and the increased expansion from Fig. 35 to Fig. 36 is the gain obtained.

Figure 32:
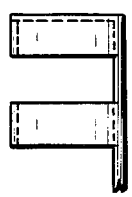
Fig. 32 is a fragmentary plan view similar to Fig. 30, but showing a modification.
Figure 33:
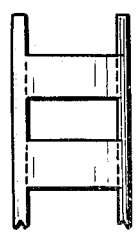
Fig. 33 is a fragmentary plan view similar to Fig. 31, but showing a modification.

It will be understood that the same full expansion shown in Fig. 36 is obtained if the guides are omitted, and Figs. 32 and 33 illustrate the upper end portions of links similar to those last described, but omitting the guides. In other words, Figs. 32 and 33 correspond to Figs. 30 and 31, but the guides 92' and 98' have been omitted. The blanks shown in Figs. 24 and 25 would be correspondingly simplified by omission of the short arms 92 and 98.

As so far described, the chains have been built up of alternate male and female blanks. It is not at all essential to employ male and female blanks, and instead, the links may be all male links. Blanks for such a chain are shown in Figs. 37 and 38. The blank of Fig. 37 comprises a cross-bar 102 having four pairs of arms 104 and five pairs of guides 106. The blank of Fig. 38 comprises a cross-bar 110 having five pairs of arms 112 and four pairs of guides 114. Thus the blank of Fig. 37 has end guides, while the blank of Fig. 38 has end arms, and it is therefore the blank of Fig. 38 that is provided with the tabs 116 for closing the edges of the chain.

The blank of Fig. 37 is folded to form the link shown in Figs. 39 and 40, said link having a cross-bar 102, arms 104, and guides 106. The blank of Fig. 38 is folded to form the link shown in Figs. 41 and 42, this comprising a cross-bar 110, arms 112, guides 114, and end closures 116.

The assembly of this chain is simpler than the assembly of a chain having alternate male and female links, for in the present case the links may be added successively to one another. The links are first folded to partially closed condition. The arms 112 are then closed around the cross-bar 102, following which the arms 104 of the next link are closed around the cross-bar 110, and so on.

It will be understood that if it is desired to provide spacers as well as guides, it is merely necessary to bend the short arms 114 and 116 in the same direction as the long arms, instead of in opposite direction. Such a modification is shown in Figs. 43 through 46. The cross-bars 102 and 110, the arms 104 and 112, and the end closure 116, all correspond to those previously described. However, the guides 106' and 114' are bent in the same direction as the regular arms, and thus act as spacers as well as guides.

Figs. 47 and 48 show a modification in which guides and spacers are wholly omitted. Figs. 47 and 48 correspond to Figs. 44 and 46, respectively, but with the spacers omitted. The advantage of using guides is to prevent a sharp bend localized at one point. This may be not only unsightly, but may damage the spring, or cause it to turn out of proper position about its longitudinal axis. If turned ninety degrees, it will no longer function to yieldably contract the chain.

It will be understood that in each form of the invention, springs are inserted between the inbent tips of the arms of one link and the crossbar of the adjacent link. Any of the springs shown in Figs. 5, 6 or 7 may be used. The most convenient method of assembly is to leave the end tabs partially or wholly open; to slide the springs into position while pushing the ends of the chain to close the mesh of the chain; and to then close the end tabs, thus locking the springs in position.

Although the links last described are all male links, alternate links differ from the intermediate links. It is possible to assemble a chain in which all of the links are alike, being made from identical blanks, but with alternate links reversed end for end compared to the intermediate links. The blank for such a chain is shown in Fig. 51, it comprising a cross-bar 120 having a number of pairs of arms 122 extending transversely therefrom, and a similar number of guides 124 offset between the arms 122, with an end tab 126 at that end of the blank having arms rather than guides. Such a blank is folded to form a link as shown in Figs. 52 and 53, the said link including cross-bar 120, arms 122, guides 124 and an end closure 126. By reversing the same link end for end, the link shown in Figs. 54 and 55 is obtained. On reflection, it will be seen that the link of Fig. 55 may be added to the link of Fig. 53, the arms 122' coming between the arms 122 and around the guides 124. Similarly, a link of Fig. 53 may then be added to the link of Fig. 55, the arms 122 coming between the arms 122', and around the guides 124'.

To assemble the chain, the links are, of course, only partially closed and the end tabs are left open. As the links are added one to another, they are closed, following which the springs are slid in place, and the end tabs then closed to hold the springs in position.

The assembly is shown in Figs. 49 and 50. In Fig. 49, the spring 130 is expanded and the chain is contracted. In Fig. 50 the spring 130' is contracted, and the chain is expanded. In order to conserve space on the drawing, only two links are shown in Figs. 49 and 50, but it will be understood that additional links may be added to form a chain of any desired length.

If it be desired to provide spacers as well as guides, it is merely necessary to bend the short arms in opposite direction, that is, in the direction of the long arms, and such a modification is shown in Figs. 56 through 59. Figs. 56 and 57 show alternate links with the end closures at the top, while Figs. 58 and 59 show the intermediate links, which are similar links reversed end for end, with the end closures at the bottom. These links may be added to form a chain of indefinite length, following which the springs are inserted, and the end tabs closed, all as previously described.

It is not essential that the arms in each link be in pairs directly opposite one another, and if desired, the arms on one side of the blank may be staggered relative to those on the other side of the blank, and if guides are used, the guides on one side of the blank may be opposite the arms on the other side of the blank. In this respect the blanks may be patterned after those shown in Patent No. 2,324,241, issued July 13, 1943 to Schoeninger. However, such links are not well adapted to the use of end tabs, and it then becomes necessary to anchor the springs in position by some other means. Moreover, the use of end closures is desirable not only to hold the springs in position, but also to conceal the springs and to improve the over-all appearance of the chain.

It is believed that the method of constructing, assembling and using my improved expansible basket-weave chain, as well as the advantages thereof, will be apparent from the foregoing detailed description. It will also be apparent that while I have shown and described the invention in a number of preferred forms, changes may be made in the structures disclosed, without departing from the spirit of the invention as sought to be defined in the following claims.

I claim:

1. An expansible basket-weave chain made up of links connected in alternation, said links each being a folded sheet metal blank having a crossbar with arms and guides projecting in substantially parallel relation from each edge of the cross-bar, said blanks being folded to form tubular-like links extending transversely of the chain, the arms of alternate links being staggered relative to the arms of the intermediate links with the arms of one link bent around the cross-bar of the adjacent link, said arms forming rows of sub-links which extend longitudinally of the chain in basket-weave formation, and said guides being shorter than said arms and extending longitudinally of the chain near both the top and bottom of the folded link, said guides being slidably received within the arms of an adjacent link and functioning to prevent the chain from being bent too sharply at a single point between two links, and springs inserted between the cross-bar of each link and the ends of the arms of the next link bent around said crossbar, said springs serving normally to cause the links to have a closed-up or solid mesh appearance, but affording expansion of the chain when placed under tension.

2. An expansible basket-weave chain made up of links connected in alternation, said links each being a folded sheet metal blank having a cross-bar with arms and guides projecting in substantially parallel relation from each edge of the cross-bar, said blanks being folded to form tubular-like links extending transversely of the chain, the arms of alternate links being staggered relative to the arms of the intermediate links, with the arms of one link bent around the cross-bar of an adjacent link, said arms forming rows of sub-links which extend longitudinally of the chain in basket-weave formation, said guides being short arms extending longitudinally of the chain near both the top and the bottom of the folded link and being located between the regular arms of the same link and being slidably received within the regular arms of an adjacent link, and springs inserted between the cross-bar of each link and the ends of the arms of the next link bent around said cross-bar, said springs being leaf springs extending transversely of the chain and the arms and extending approximately parallel to the cross-bar, said springs serving normally to cause the links to have a closed-up or solid mesh appearance, but affording expansion of the chain when placed under tension, said guides functioning to prevent the chain from being bent sharply at a single point between two links which might otherwise result in loss of control or loss of proper spring position.

3. An expansible basket-weave chain as defined in claim 1, in which alternate link ends have tabs bent transversely of the link to close the end of the link, the resulting end closures serving to hold the springs in position.

4. An expansible basket-weave chain as defined in claim 2, in which the alternate link ends have tabs bent transversely of the link to close the end of the link, said tabs extending in the direction of the arms, with the ends of the tabs integrally connected to the ends of the cross-bar, the edges of said tabs being so shaped as to entirely close the space between the arms, the resulting end closures serving to hold the springs in position.

5. An expansible basket-weave chain as defined in claim 1, in which alternate links are male links having a center cross-bar with arms projecting transversely therefrom, and in which the intermediate links are female links having collateral center and edge bars with transverse arms connecting said bars.

6. An expansible basket-weave chain as defined in claim 2, in which alternate links are male links having a center cross-bar with arms projecting transversely therefrom, and in which the intermediate links are female links having collateral center and edge bars with transverse arms connecting said bars, and in which alternate link ends have tabs bent transversely of the link to close the end of the link, the resulting end closures serving to hold the springs in position.

7. An expansible basket-weave chain as defined in claim 1, in which all of the links are male links having a center cross-bar with arms projecting transversely therefrom.

8. An expansible basket-weave chain as defined in claim 2, in which all of the links are male links having a center cross-bar with arms projecting transversely therefrom, and in which alternate link ends have tabs bent transversely of the link to close the end of the link, the resulting end closures serving to hold the springs in position.

9. An expansible basket-weave chain as defined in claim 1, in which the guides are arranged and dimensioned to act also as spacers, said combined guides and spacers pointing in the same general direction as the regular arms, and said springs being at least partially received between said combined guides and spacers, whereby said spacers function to protect the springs and to limit the maximum expansion of the chain.

10. An expansible basket-weave chain as defined in claim 1, in which the guides are arranged and dimensioned to act also as spacers, said combined guides and spacers pointing in the same general direction as the regular long arms, and said springs being at least partially received between said combined guides and spacers whereby said spacers function to protect the springs and to limit the maximum expansion of the chain, and in which alternate link ends have tabs bent transversely of the link to close the end of the link, the resulting end closures serving to hold the springs in position.

11. An expansible basket-weave chain as defined in claim 1, in which alternate links are male links having a center cross-bar with arms projecting transversely therefrom, and in which the intermediate links are female links having collateral center and edge bars with transverse arms connecting said bars, and in which the guides are arranged and dimensioned to act also as spacers, said combined guides and spacers pointing in the same general direction as the regular long arms, and said springs being at least partially received between said combined guides and spacers, whereby said spacers function to protect the springs and to limit the maximum expansion of the chain.

12. An expansible basket-weave chain as defined in claim 1, in which alternate links are male links having a center cross-bar with arms projecting transversely therefrom, and in which the intermediate links are female links having collateral center and edge bars with transverse arms connecting said bars, and in which the guides are arranged and dimensioned to act also as spacers, said combined guides and spacers pointing in the same general direction as the regular long arms, and said springs being at least partially received between said spacers, whereby said spacers function to protect the springs and to limit the maximum expansion of the chain, and in which alternate link ends have tabs bent transversely of the link to close the end of the link, the resulting end closures serving to hold the springs in position.

13. An expansible basket-weave chain as defined in claim 1, in which all of the links are male links having a center cross-bar with arms projecting transversely therefrom, and in which the guides are arranged and dimensioned to act also as spacers, said combined guides and spacers pointing in the same general direction as the regular long arms, and said springs being at least partially received between said combined guides and spacers, whereby said spacers function to protect the springs and to limit the maximum expansion of the chain.

14. An expansible basket-weave chain as defined in claim 1, in which all of the links are male links having a center cross-bar with arms projecting transversely therefrom, and in which the guides are arranged and dimensioned to act also as spacers, said combined guides and spacers pointing in the same general direction as the regular long arms, and said springs being at least partially received between said combined guides and spacers, whereby said spacers function to protect the springs and to limit the maximum expansion of the chain, and in which alternate link ends have tabs bent transversely of the link to close the end of the link, the resulting end closures serving to hold the springs in position.

LEON A. WILLIAMS.

REFERENCES CITED

The following references are of record in the file of this patent:

UNITED STATES PATENTS

| Number | Name | Date |
|---|---|---|
| 1,795,039 | Prestinari | Mar. 3, 1931 |
| 1,822,393 | Fassnacht et al. | Sept. 8, 1931 |

FOREIGN PATENTS

| Number | Country | Date |
|---|---|---|
| 283,814 | Great Britain | Jan. 19, 1928 |